(12) United States Patent
Siller et al.

(10) Patent No.: US 9,789,439 B2
(45) Date of Patent: Oct. 17, 2017

(54) CARBON CAPTURE

(71) Applicant: UNIVERSITY OF NEWCASTLE UPON TYNE, Newcastle Upon Tyne (GB)

(72) Inventors: Lidija Siller, Newcastle Upon Tyne (GB); Gaurav Ashok Bhaduri, Newcastle Upon Tyne (GB)

(73) Assignee: University of Newcastle upon Tyne, Newcastle (GB)

( * ) Notice: Subject to any disclaimer, the term of this patent is extended or adjusted under 35 U.S.C. 154(b) by 206 days.

(21) Appl. No.: 14/401,043

(22) PCT Filed: May 14, 2013

(86) PCT No.: PCT/GB2013/051243
§ 371 (c)(1),
(2) Date: Nov. 13, 2014

(87) PCT Pub. No.: WO2013/171480
PCT Pub. Date: Nov. 21, 2013

(65) Prior Publication Data
US 2015/0151248 A1    Jun. 4, 2015

(30) Foreign Application Priority Data

May 15, 2012 (GB) .................................. 1208511.4

(51) Int. Cl.
*B01D 53/86* (2006.01)
*B01D 53/62* (2006.01)
(Continued)

(52) U.S. Cl.
CPC ......... *B01D 53/8671* (2013.01); *B01D 53/62* (2013.01); *B01D 53/88* (2013.01); *B01J 19/24* (2013.01); *B01J 23/755* (2013.01); *B01J 35/002* (2013.01); *B01J 35/0013* (2013.01); *B01J 35/06* (2013.01); *C01B 31/24* (2013.01); *C01F 5/24* (2013.01); *C01F 11/18* (2013.01); *C01F 11/181* (2013.01); *F23J 15/04* (2013.01);
(Continued)

(58) Field of Classification Search
None
See application file for complete search history.

(56) References Cited

U.S. PATENT DOCUMENTS

2004/0197884 A1* 10/2004 Okuda .................. B82Y 10/00
435/174

FOREIGN PATENT DOCUMENTS

EP        2204227           7/2010
ES        2347629    *  11/2010 ............. B01D 53/02
(Continued)

OTHER PUBLICATIONS

Search Report; GB1208511.4, dated Sep. 14, 2012.
(Continued)

*Primary Examiner* — Daniel Berns
(74) *Attorney, Agent, or Firm* — Koren Anderson

(57) ABSTRACT

The present invention relates to the use of solid metal materials for catalyzing the hydration of carbon dioxide. It also relates to methods of and apparatus for hydrating carbon dioxide and capturing carbon. The solid metal materials may be nickel nanoparticles. The invention finds particular application in the sequestration of carbon dioxide either at the point of release or from the atmosphere.

19 Claims, 11 Drawing Sheets

(51) Int. Cl.
- *B01D 53/14* (2006.01)
- *B01J 23/755* (2006.01)
- *B01J 35/00* (2006.01)
- *B01J 35/06* (2006.01)
- *B01D 53/88* (2006.01)
- *C01F 11/18* (2006.01)
- *F23J 15/04* (2006.01)
- *C01F 5/24* (2006.01)
- *B01J 19/24* (2006.01)
- *C01B 31/24* (2006.01)

(52) U.S. Cl.
CPC .... *B01D 53/1493* (2013.01); *B01D 2251/304* (2013.01); *B01D 2251/402* (2013.01); *B01D 2251/404* (2013.01); *B01D 2251/604* (2013.01); *B01D 2252/103* (2013.01); *B01D 2252/602* (2013.01); *B01D 2255/20753* (2013.01); *B01D 2255/92* (2013.01); *B01D 2257/504* (2013.01); *B01D 2258/0283* (2013.01); *B01D 2258/06* (2013.01); *B01J 2219/24* (2013.01); *F23J 2219/10* (2013.01); *Y02C 10/04* (2013.01); *Y02E 20/326* (2013.01); *Y02P 20/152* (2015.11); *Y02W 10/37* (2015.05)

(56) References Cited

FOREIGN PATENT DOCUMENTS

| | | | |
|---|---|---|---|
| JP | 2000086237 | 3/2000 | |
| JP | 2001114514 | 4/2001 | |
| KR | 10-2011-0110388 | * 10/2011 | ............... G01L 1/18 |
| WO | WO 2009/052313 | 4/2009 | |
| WO | WO 2010/125210 | 11/2010 | |
| WO | WO 2011/014957 | 2/2011 | |
| WO | WO 2011/049996 | 4/2011 | |
| WO | WO 2011/054107 | 5/2011 | |

OTHER PUBLICATIONS

ISR and Written Opinion; PCT/GB2013/051243, dated Nov. 6, 2013.

Vinoba et al., Carbonic Anhydrase Conjugated to Nanosilver Immobilized onto Mesoporous SBA-15 for Sequestration of CO2;J. of Mol. Catal C: Enzymes (2012) 60-67.

\* cited by examiner

CARBON CAPTURE

This invention relates to methods and apparatus for the capture or fixation of carbon dioxide and to methods of increasing the rate of hydration of carbon dioxide. The methods use a solid metal to catalyse the hydration of carbon dioxide.

BACKGROUND

Carbon dioxide ($CO_2$) is released into the atmosphere by the burning of wood, coal, oil and gas. It can also be released by volcanoes and livestock. The pre-industrial carbon dioxide level was around 278 ppm and had stayed fairly constant for several centuries. In the $20^{th}$ century atmospheric carbon dioxide levels have increased from about 315 ppm in 1958 to 378 ppm at the end of 2004. Thus, since the beginning of the industrial revolution the concentration of carbon dioxide in the atmosphere has increased by around 36%. Carbon dioxide is a greenhouse gas, contributing to the increasing of the temperature of the earth. Carbon dioxide from the atmosphere is also absorbed by the oceans where it forms carbonic acid and increases the acidity of the water, impacting on populations of many life forms and threatening delicate ecosystems such as the coral reefs.

One method of reducing the amount of carbon dioxide in the atmosphere is to capture and store it as it is produced rather than release it into the atmosphere.

Of the various approaches to the capture and storage of carbon dioxide, the one that has gained the interest of governments and industries is storage of carbon dioxide in geological forms. The geological storage of carbon dioxide can be achieved in two ways: a) separate the carbon dioxide and pump it into empty or depleted oil wells (both terrestrial and oceanic oil wells can be used); or b) to convert it into calcium carbonate and dispose of it as landfill. One limitation of method a) is that there has to be a continuous monitoring of the oil well for possible leaks (especially for oceanic storage). The conversion to calcium carbonate for use in landfill is considered to provide a more reliable solution to the problem of carbon dioxide storage.

Calcium carbonate is a thermodynamically stable material and is abundantly found on the earth's surface. The calcium carbonate present on the earth is estimated to be a carbon reservoir equivalent to $150,000 \times 10^{12}$ metric tons of carbon dioxide. Carbonates have been proven safe for long-term storage of carbon dioxide. An alternative to calcium carbonate is magnesium carbonate, which has similar properties. A combination of calcium and magnesium carbonate can also be used. The conversion of carbon dioxide into calcium carbonate (or other carbonates) is known as mineralisation. The rate limiting step in the mineralization of carbon dioxide is the hydration of carbon dioxide to form carbonate ions.

At present carbonic anhydrases (CAs) are seen as the most promising candidate for sequestering carbon dioxide. CAs catalyse the reversible hydration of carbon dioxide at mild pH values, with the fastest rates being observed for human CA II. The cost of extraction of enzymes limits their utility in the industrial context. They also only operate in a narrow pH range and so require the presence of a buffer. Additionally, enzymes can be unstable at elevated temperatures. There are some examples in the literature of carbonic anhydrase immobilised on nanoparticles being used for the hydration and capture of carbon dioxide (Vinoba et al., *Langmuir*, 2011, 27, 6227-6234; Vinoba et al., *Journal of Molecular Catalysis B: Enzymatic*, 75, 2012, 60-67). The nanoparticles were impregnated onto silica/alumina support.

Recently there have been a few reports on organometallic complexes being used for the reversible hydration of carbon dioxide. Holm et al (*Inorg. Chem.* 2011, 50, 100070-81; *Proc. Nat. Acad. Sci.*, 2011, 108, 1222-7) have shown that nickel hydroxide complexes with 2,6-pyridinedicarboxamidate pincer ligands fix carbon dioxide very rapidly, but these processes are not catalytic. Organometallic compounds can be unstable to extreme conditions.

Accordingly, there remains a need for an improved method for the capture of carbon dioxide.

BRIEF SUMMARY OF THE DISCLOSURE

In a first aspect of the invention is provided the use of a solid metal as a catalyst for the hydration of carbon dioxide, wherein the solid metal is selected from Co, Ni, Cu and Zn.

In a second aspect of the invention is provided a method of capturing carbon dioxide; the method comprising:
 reacting carbon dioxide with water in the presence of a solid metal catalyst selected from Co, Ni, Cu and Zn.

In a third aspect of the invention is provided a method of increasing the rate of hydration of carbon dioxide; the method comprising:
 reacting carbon dioxide with water in the presence of a solid metal catalyst selected from Co, Ni, Cu and Zn.

In a fourth aspect of the invention is provided a method of reducing the amount of carbon dioxide which enters the atmosphere from combustion, the method comprising:
 reacting carbon dioxide with water in the presence of a solid metal catalyst selected from Co, Ni, Cu and Zn.

In a fifth aspect of the invention is provided a method of producing calcium carbonate; the method comprising:
 reacting carbon dioxide with water in the presence of a solid metal catalyst selected from Co, Ni, Cu and Zn; and
 adding a base and a $M^{2+}$ solution to the product of the reaction between carbon dioxide and water, wherein M is selected from Ca and Mg, or a mixture of the two.

In a sixth aspect of the invention is provided the use of a solid metal for capturing carbon dioxide, wherein the solid metal is selected from Co, Ni, Cu and Zn.

In a seventh aspect of the invention is provided an apparatus for carbon capture; the apparatus comprising:
 a hydration tank containing a liquid comprising water and a solid metal selected from Co, Ni, Cu and Zn in contact with the liquid;
 a means for bubbling $CO_2$ through the liquid.

In an eighth aspect of the invention is provided a kit for capturing carbon dioxide, the kit comprising:
 a solid metal catalyst selected from Co, Ni, Cu and Zn; and
 instructions for use of the solid metal catalyst in capturing carbon dioxide.

In a ninth aspect of the invention is provided a method of hydrating carbon dioxide; characterised in that:
 a solid metal is used as a catalyst, the solid metal being selected from Co, Ni, Cu and Zn.

The following embodiments may apply, where appropriate, to any aspect of the invention.

In a preferred embodiment, the metal is Ni.

In an embodiment, the solid metal is in the form of particles, wires or fibres. The solid metal may be in the form of particles. The particles may be microparticles or nanoparticles. The metal may also be in the form of nanowires or nanofibres. In a preferred embodiment, the metal is in the form of nanoparticles, nanowires or nanofibres. The metal may be in the form of nanoparticles.

The solid metal may also be in the form of foams and/or flakes, e.g. nanofoams and/or nanoflakes.

In a preferred embodiment, the solid metal is Ni nanoparticles, nanowires or nanofibres. In a particularly preferred embodiment, the solid metal is Ni nanoparticles.

In an embodiment, the solid metal is immobilised on a solid support. In an embodiment, the support is an oxide support, e.g. a silicate support or an alumina support.

In an embodiment, the solid metal is irradiated. Thus, it may be irradiated with electromagnetic radiation in a region selected from the UV, IR or visible regions of the electromagnetic spectrum, and combinations thereof. In an embodiment, the solid metal is irradiated with visible light. The visible light may be sunlight.

In a ninth aspect of the invention is provided calcium carbonate containing a detectable amount of nickel particles.

In an embodiment, the nickel particles are nickel nanoparticles.

BRIEF DESCRIPTION OF THE DRAWINGS

Embodiments of the invention are further described hereinafter with reference to the accompanying drawings, in which.

DETAILED DESCRIPTION

Figure 1:
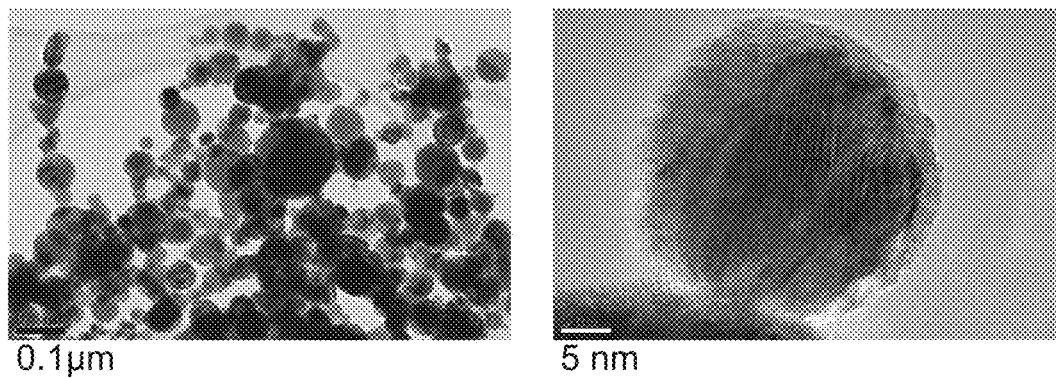
FIG. 1 shows transmission electron microscopy images of Ni nanoparticles.

When bubbled through water, carbon dioxide is hydrated to form carbonic acid, carbonate ions and/or bicarbonate ions depending on the conditions employed. Unless a buffer or a base is present in the solution, a carbonic acid solution is generated. The inventors have surprisingly identified that solid transition metals can be used as catalysts to increase the rate at which the carbon dioxide is converted to carbonic acid, carbonate ions and/or bicarbonate ions. In other words, the inventors have surprisingly identified that solid transition metals can catalyse the hydration of carbon dioxide. The solid metal may also increase the amount of carbon dioxide which can be fixed by the solution.

Advantageously, the use of a solid metal, rather than a metal ion encapsulated in an enzyme or complexed with organic ligands, allows the carbon capture process to be conducted under a wider range of conditions, e.g. high temperatures, high pressures, low pressures, high pH, low pH. At higher temperatures, enzymes and organometallic complexes are prone to decomposition and this can limit their utility, especially when capturing $CO_2$ from a combustion process which necessarily also produces heat. Enzymes and many organometallic complexes are only stable in relatively narrow pH ranges.

A further benefit of the use of a solid metal is that a solid metal can be more easily retrieved (e.g. by filtration, sedimentation, centrifugation) from the hydration reaction mixture than species which are soluble in water. Once recovered from the reaction a solid metal can be reused.

A solid metal can be used as a catalyst for the hydration of carbon dioxide on an industrial scale.

By solid metal is meant a solid which comprises the metal. A solid metal may be a metal which is substantially present in the (0) oxidation state. It may be, for example, that the majority of the metal is in the (0) oxidation state. As an example, if the metal is nickel the majority of the nickel may be present as Ni(0). It is possible that the metal is also present in other oxidation states. It is possible that the active form (i.e. the catalytic form) of the metal is not the (0) oxidation state. For example, in the case of nickel, it may be that positive nickel ions (e.g. $Ni^{2+}$ ions) on the surface of the metal are the active catalytic species. It is equally possible that the (0) oxidation state of the metal (e.g. nickel(0)) is the active catalytic species.

It is within the scope of this invention that the solid metal comprises other elements. Thus, the solid metal may substantially be a solid compound which contains the metal and which is not soluble in the medium of the reaction, e.g. which is not soluble in water. Thus, in the case of nickel, the solid metal may substantially be a solid $Ni^{2+}$ compound which is not soluble in water, e.g. NiO. Alternatively, the solid metal may substantially be a compound in which nickel is in any other positive oxidation state, e.g. $NiO_2$ or $Ni_2O_3$. As an illustrative example, if the solid metal is nickel nanoparticles, this includes both Ni nanoparticles and NiO nanoparticles.

The metal may comprise other materials. It may be in the form of a thin film on a substrate comprising the other materials. Such a thin film may be formed by any means known to those in the art, e.g. vapour deposition, plasma deposition, electroplating etc. The thin film may be a layer of a laminate, preferably being one of the outer layers of that laminate. The other materials may be other metals (e.g. other transition metals). Alternatively, the solid metal may be in the form of an alloy comprising the metal. In embodiments in which the metal is in the form of a nanoparticle, the nanoparticle may be immobilised on a support.

To restate the three paragraphs above, the catalyst may be a solid metal material, e.g. a material selected from nickel, NiO, $NiO_2$, $Ni_2O_3$, another compound with nickel in a positive oxidation state. When the material is nickel, positive nickel ions on the surface of the metal may be the active catalytic species.

Although the aspects of the invention specifically described in the present application are directed to solid metals selected from Co, Ni, Cu or Zn, it is within the scope of the invention that the solid metal is any transition metal.

'Transition metal' refers to any element in the transition period (i.e. the d-block) of the periodic table. Thus, transition metal may refer to one or more elements selected from Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg.

In a preferred embodiment of the reaction the solid metal is nickel. Nickel is ferromagnetic. A ferromagnetic metal allows the easy separation of the metal from a reaction mixture using some form of magnet. If necessary, it also allows the easy separation of the metal from other solid products of the reaction, again using some form of magnet e.g. using magnetic field filtration. This eases the recovery of the metal and allows it to be reused, thus reducing costs.

In some embodiments of the invention the solid metal is in the form of particles, such as nanoparticles and microparticles, nanowires or nanofibres. Smaller solid metal forms, such as micro- and nano-particles, nanowires or nanofibres offer the benefit of a substantially increased surface area compared to the same quantity of larger pieces of metal, increasing the amount of metal atoms which are available for performing the catalysis.

Nanoparticles will be readily understood by those skilled in the art as referring to particles in which the majority of the particles are 100 nm or less in size.

Microparticles will be readily understood by those skilled in the art as referring to particles in which the majority of the particles are from 0.1 to 100 μm in size.

Nanowires and nanofibres are wires and fibres with a diameter which is 100 nm or less.

Capturing carbon dioxide can be understood to mean the conversion of carbon dioxide gas into a form which can be easily transported and stored, i.e. conversion to a safe and stable solid or liquid.

The carbon dioxide which is captured or hydrated in the methods of the invention may have been released by combustion. It may have been released by livestock. It may have been released by a volcano.

The carbon dioxide may be the direct product of the process in which it was generated or it may have been purified or partially purified prior to being captured in the method or use of the invention. It may contain other products of the process in which it was generated such as carbon monoxide, sulphur dioxide, hydrogen sulphide, methane, other organic molecules, particulate matter, steam, nitrogen oxides. Alternatively, the carbon dioxide may be substantially pure.

Methods of the Invention

The invention provides a method of capturing carbon dioxide, hydrating carbon dioxide, increasing the rate of hydration of carbon dioxide, or reducing the amount of carbon dioxide which enters the atmosphere from combustion;
the method comprising reacting carbon dioxide with water in the presence of a solid metal catalyst selected from Co, Ni, Cu and Zn.

Where the method is a method of reducing the amount of carbon dioxide which enters the atmosphere from combustion, the carbon dioxide which is reacted with the water is produced by (i.e. released by) combustion.

In an embodiment, the method further comprises the step of separating the solid metal from the product of the reaction between carbon dioxide and water.

In an embodiment, the method further comprises the step of adding a $M^{2+}$ solution to the product of the reaction between carbon dioxide and water, wherein M is selected from Ca or Mg, or a mixture of the two.

In an embodiment, the method further comprises the step of adding a base to the product of the reaction between carbon dioxide and water.

In an embodiment, the method further comprises the step of adding a $M^{2+}$ solution and a base to the product of the reaction between carbon dioxide and water, wherein M is selected from Ca or Mg, or a mixture of the two.

In an embodiment, the $M^{2+}$ solution is an $MCl_2$ solution. In an embodiment, the $M^{2+}$ solution is a $Ca^{2+}$ solution. In a preferred embodiment, the $M^{2+}$ solution is a $CaCl_2$ solution.

In an embodiment, the base comprises hydroxide ions. In a further embodiment, the base is an alkali metal hydroxide (e.g., LiOH, NaOH or KOH). In a preferred embodiment, the base is NaOH.

In an embodiment, the base is in solution, e.g. an aqueous solution. In a further embodiment, the concentration of the base is 1 M or less. In a preferred embodiment, the concentration of the base is from 0.1 M to 0.5 M.

In an embodiment, reacting carbon dioxide with water comprises passing carbon dioxide through a liquid, wherein the liquid comprises water.

'Passing carbon dioxide through' may mean 'bubbling carbon dioxide through'. 'Bubbling' will be readily understood by the person skilled in the art to mean delivering a gas into a liquid at a point below the surface of that liquid, and allowing the gas to move upwards through the liquid.

In an embodiment, the liquid is water or an aqueous solution.

In an embodiment, the solid metal (e.g. nickel) is suspended in the liquid.

In an embodiment, the solid metal (e.g. nickel) is irradiated as the carbon dioxide reacts with the water, e.g. is irradiated with visible light. The visible light may be sunlight.

In an embodiment, the reaction between carbon dioxide and water is performed at a temperature of 25° C. or above. In an embodiment, the temperature may be from 25 to 100° C. In an embodiment, the temperature is from 50 to 70° C. It may be that the $CO_2$ is at a temperature greater than 25° C. before it is passed through the liquid.

In an embodiment, the reaction of carbon dioxide with water occurs in a hydration tank.

The word 'tank' used in this specification (for instance 'hydration tank' or 'settling tank') is not intended to be limiting. A 'tank' may be any vessel suitable for holding a liquid. For example, a 'tank' may be sealed or it may be open.

In an embodiment, the solid metal (e.g. nickel) may be sonicated prior to use. This sonication can occur before the metal is added to the hydration tank or while the metal is in the hydration tank.

In an embodiment, the solid metal (e.g. nickel) is mixed with the water prior to addition to the hydration tank. This may occur in a mixing chamber.

In an embodiment, the liquid may be heated in the hydration tank. It may be that the $CO_2$ is at a temperature greater than 25° C. before it is passed through the liquid. In an alternative embodiment, the $CO_2$ may be cooled before being passed through the liquid.

In an embodiment, the $CO_2$ may be purified or partially purified before being passed through the liquid.

'Partially purified' can be understood to mean that one or more substances (e.g. other gases) which were mixed with the carbon dioxide have been removed. These other substances may be completely removed or they may be partially removed. This removal can be achieved using filters or scrubbers or other means which would be readily understood by those in the art.

In an embodiment, the concentration of the solid metal in the liquid is greater than about 10 ppm. In a further embodiment, the concentration is from about 10 to about 100 ppm. In an embodiment, the concentration is from about 10 to about 50 ppm. In an embodiment, the concentration of the solid metal in the liquid is about 30 ppm.

In an embodiment, the method further comprises the step of adding a solution comprising $M^{2+}$ ions to the liquid after the $CO_2$ has been passed through the liquid, wherein M is selected from Ca or Mg, or a mixture of the two.

In an embodiment, the $CO_2$ is passed through the liquid in a hydration tank, the liquid is transferred to a settling tank, and the $M^{2+}$ solution is added to the liquid in the settling tank, wherein M is selected from Ca or Mg, or a mixture of the two. Alternatively, the $CO_2$ is passed through the liquid and the $M^{2+}$ solution is added to the liquid in the same tank.

In an embodiment, the method further comprises the step of adding a base to the liquid after the $CO_2$ has been passed through the liquid. In an embodiment, the $CO_2$ is passed through the liquid in a hydration tank, the liquid is transferred to a settling tank, and the base is added to the liquid in the settling tank. Alternatively, the $CO_2$ is passed through the liquid and the base is added to the liquid in the same tank.

In an embodiment, the method further comprises the step of adding a $M^{2+}$ solution and a base to the liquid after the $CO_2$ has been passed through the liquid, wherein M is selected from Ca or Mg, or a mixture of the two. In an embodiment, the $CO_2$ is bubbled through the liquid in a hydration tank, the liquid is transferred to a settling tank, and the $M^{2+}$ solution and the base are added to the liquid in the settling tank. Alternatively, the $CO_2$ is passed through the liquid and the $Ca^{2+}$ solution and the base are added to the liquid in the same tank.

The $M^{2+}$ solution may also comprise the base or it may be added separately to the base.

In an embodiment, the pH of the liquid in the settling tank is maintained at a level greater than about 5. In a further embodiment, the pH of the liquid in the settling tank is maintained at a level from about 6.5 to about 7. The maintenance of the pH can be achieved by controlling the rate of addition of the liquid from the hydration tank or by controlling the rate of addition of the base.

In an embodiment, the $M^{2+}$ solution is an $MCl_2$ solution. In an embodiment, the $M^{2+}$ solution is a $Ca^{2+}$ solution. In a preferred embodiment, the $M^{2+}$ solution is a $CaCl_2$ solution.

In an embodiment, as the liquid is transferred to the settling tank it passes through a separator which separates the solid metal from the liquid. If the metal is ferromagnetic (e.g. if the metal is nickel), the separator may be a magnetic separator.

In an alternative embodiment, the liquid is separated from the solid metal before the liquid is transferred from the hydration tank. This may be achieved by filtration, particularly if the metal is attached to a solid support. In this embodiment, the solid metal may remain in the hydration tank. In embodiments in which the metal is ferromagnetic, a magnet may be used to retain the metal in the hydration tank.

In an embodiment, once separated from the liquid, the metal is transferred to the hydration tank. It may be transferred directly or it may be mixed with water and then added to the hydration tank. Thus it may be transferred to a mixing chamber, mixed with water and then transferred to the hydration chamber.

In embodiments in which the liquid in the hydration tank is heated, it may be cooled before it is added to the settling tank.

In an embodiment, the method further comprises the step of separating a solid product from the liquid. 'Solid product' may be understood to mean a solid product which is formed at any stage of the method described herein. The solid product may be formed during the hydration step or it may be formed during subsequent steps, such as when a $M^{2+}$ solution is added to the product of the reaction between carbon dioxide and water.

In some embodiments, this solid product will comprise $MCO_3$ and the separation will occur after the $M^{2+}$ solution has been added to the liquid. In a preferred embodiment, the settling tank is attached to a solid separator.

It may be that the solid product also comprises the solid metal. In other words the solid which is separated from the liquid contains both the solid metal and a solid product which is formed at any stage of the method of the invention. In an embodiment, the method further comprises the step of separating the solid metal from the solid product. If the metal is ferromagnetic (e.g. if the metal is nickel), this may be achieved using a magnet. In an embodiment, once separated from the solid product, the metal is transferred to the hydration tank.

In some embodiments the isolated solid product may contain detectable amounts of the solid metal.

In an embodiment, the method further comprises removing excess liquid from one or both of the tanks. In an embodiment, the method further comprises removing excess liquid from the settling tank. This excess liquid may be an alkali metal chloride solution (e.g. a sodium chloride solution).

In an embodiment, the methods of the invention are continuous.

Apparatus of the Invention

In a seventh aspect of the invention is provided an apparatus for carbon capture; the apparatus comprising:
    a hydration tank containing a liquid comprising water and a solid metal selected from Co, Ni, Cu and Zn in contact with the liquid;
    a means for bubbling $CO_2$ through the liquid.

In an embodiment, the apparatus further comprises: a settling tank connected to the hydration tank and a means for transferring the liquid from the hydration tank to the settling tank.

In an embodiment, the apparatus further comprises a mixing chamber attached to the hydration tank. In an embodiment, the mixing chamber comprises a mixing device, e.g. a mechanical stirrer.

In an embodiment, the apparatus comprises a means for separating the solid metal from the liquid. In an embodiment, this means is situated in the hydration tank. In an alternative embodiment, the means for transferring the liquid from the hydration tank to the settling tank comprises a means for separating the solid metal from the liquid. In an embodiment, the means is a means of filtering. In an embodiment, the means is a magnetic means.

In an embodiment, the means for transferring the liquid from the hydration tank to the settling tank comprises a cooling device.

In an embodiment, the hydration tank comprises a vent.

In an embodiment, the hydration tank comprises a source of water.

In an embodiment, the hydration tank comprises a heat source.

In an embodiment, the settling tank comprises a source of $Ca^{2+}$.

In an embodiment, the settling tank comprises a source of base (e.g. a source of hydroxide ions).

In an embodiment, the settling tank comprises a mixing device, e.g. a mechanical stirrer.

In an embodiment, the hydration tank comprises a mixing device, e.g. a mechanical stirrer.

In an embodiment, the settling tank comprises one or more outlet pipes. These outlets are preferably situated towards the top of the settling tank.

In an embodiment, the apparatus comprises a means for separating solid product from a liquid. In an embodiment, this means is attached to the settling tank. In an embodiment, this means is preferably attached at or near the bottom of the settling tank. In an embodiment, this means is a screw conveyor.

In an embodiment, the apparatus comprises a means for irradiating the solid metal, e.g. a means for irradiating the solid metal with visible light. The means may cause or allow the irradiating. The visible light may be sunlight. The means for irradiating the solid metal may be or comprise a device which generates radiation (e.g. a lamp) or it may be that at least a portion of the reaction vessel is transparent or substantially transparent or it may be a combination of a device which generates radiation and that at least a portion of the reaction vessel is transparent or substantially transparent.

In an embodiment, the apparatus is suitable for carrying out the methods of the invention.

Figure 7:
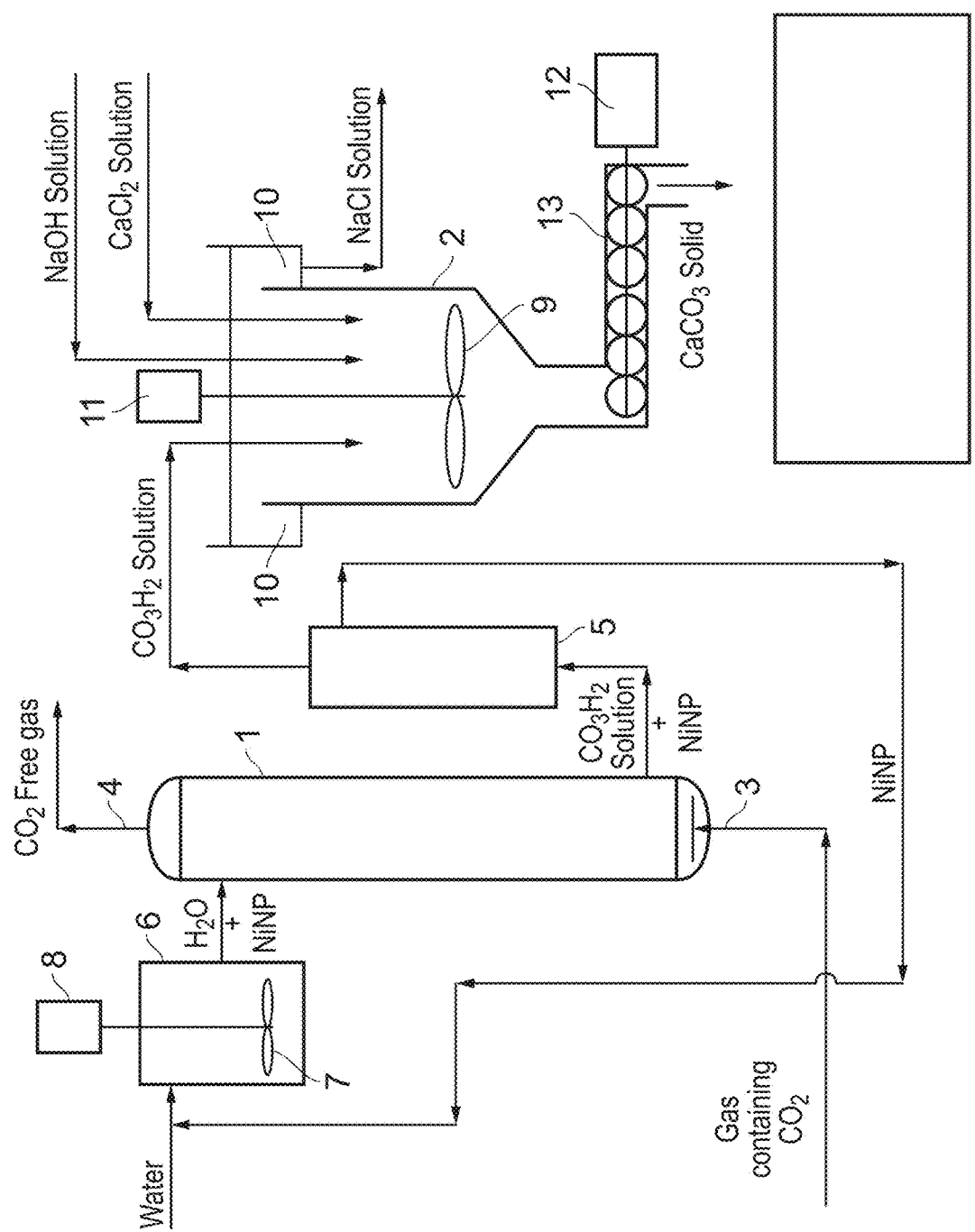
FIG. 7 shows a schematic diagram of an apparatus suitable for practicing the methods of the invention.

FIG. 7 shows a schematic diagram of an apparatus suitable for practicing the methods of the invention. This is provided for illustrative purposes only and is not intended to limit the scope of the invention.

The apparatus comprises a hydration tank 1 and a settling tank 2.

The hydration tank comprises a bubbler 3 (which may also be known as a sparger) which allows the gas containing $CO_2$ to be bubbled through the hydration tank 1. The hydration tank also comprises a vent 4 situated towards the top of the hydration tank, through which any $CO_2$ free gas can escape. In use the hydration tank will contain water and nickel nanoparticles and the $CO_2$ gas which is bubbled through the tank will be converted to carbonic acid in solution.

The apparatus also comprises a mixer chamber 6 in which the nickel nanoparticles are suspended in water. The mixer chamber 6 comprises a mechanical stirrer 7 and a motor 8, which drives the stirrer 7.

The carbonic acid solution, with the nickel nanoparticles in suspension is connected to a magnetic separator 5. This separates the ferromagnetic nickel nanoparticles from the carbonic acid solution. The nickel nanoparticles are then transferred back to into the mixer chamber 6 and reused in the hydration reaction. The carbonic acid solution is transferred to the settling tank 2.

A NaOH solution and a $CaCl_2$ solution are added to the settling tank 2 and solid calcium carbonate is formed, along with NaCl is solution.

The settling tank 2 comprises a mechanical stirrer 9, driven by a motor 11.

The settling tank 2 comprises one or more outlet pipes 10 through which excess liquid, which largely comprises an NaCl solution, flows. The settling tank is connected, towards the bottom, to a screw conveyor 13 which continuously removes the solid $CaCO_3$ from the settling tank. The screw conveyor is driven by a motor 12.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

EXAMPLES—GENERAL EXPERIMENTAL $CO_2$ cylinder (99% pure) was bought from BOC. The nickel nanoparticles were purchased from Nano Technologies, Korea. Sodium hydroxide and hydrochloric acid (0.1 M) were bought from Sigma Aldrich and were used without further purification. The water used both for the examples and for chemical preparation was distilled and filtered and had a low conductivity. 0.1 M NaOH solution was prepared by dissolving NaOH in deionised water and was standardised using 0.1 M HCl solution.

Example 1

Figure 2:
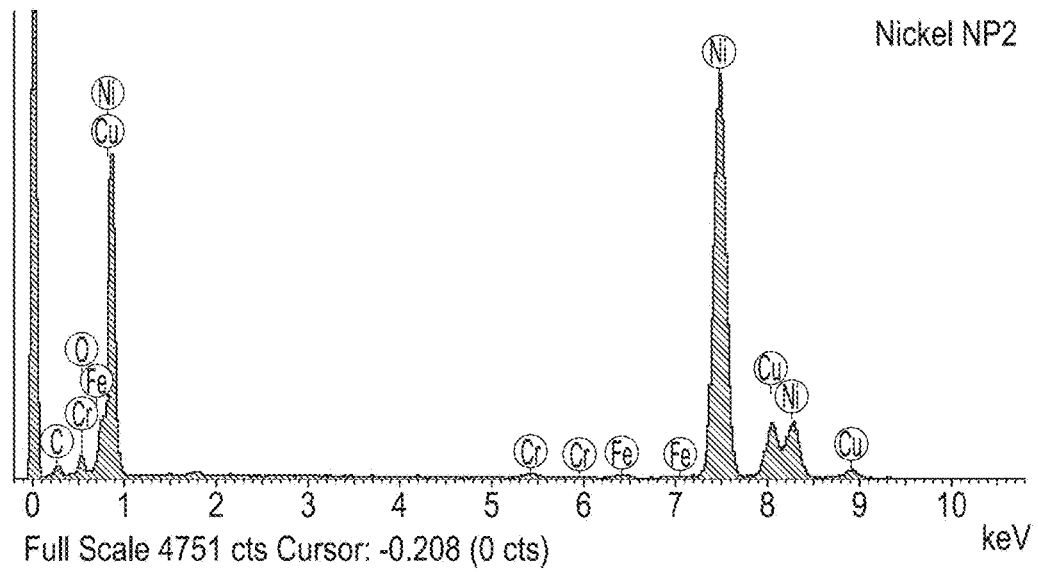
FIG. 2 shows Energy Dispersive X-ray Spectroscopic results of Ni nanoparticles.
Figure 3:
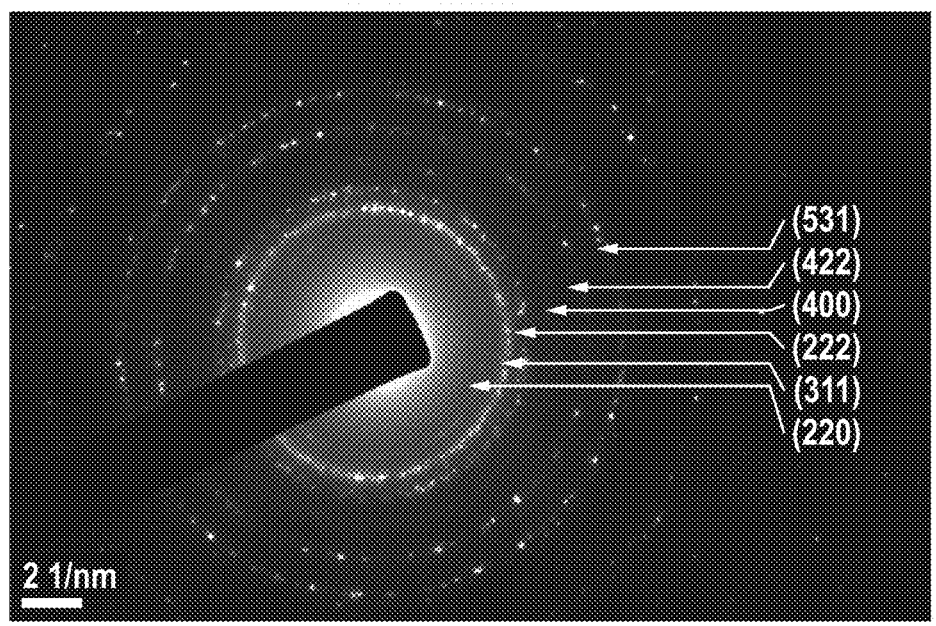
FIG. 3 shows Selected Area Electron Diffraction result of Ni nanoparticles.

The purchased nanoparticles were characterized using transmission electron microscopy (TEM) to determine the size distribution of the nanoparticles. The TEM images of the Ni nanoparticles can be seen in FIG. 1. The size of majority of the particles was below 100 nm as prescribed by the manufacturer. The presence of the Ni nanoparticles was confirmed using energy dispersive X-ray spectroscopy (EDX) seen in FIG. 2. The crystal planes of the nanoparticles can be seen by the Selected Area Electron Diffraction (SAED) pattern (FIG. 3) and correspond to the [220], [311], [222], [400], [422] and [531] lattice planes respectively. From the pattern it can be concluded that the nanoparticles are poly crystalline in structure.

Example 2

The experiment for determination of concentration of $CO_2$ was done in a 20 ml jacketed vessel purchased from Soham Scientific. $CO_2$ gas (at 1 atm) was bubbled in 10 ml of deionised water or Ni nanoparticle suspension for 30 min and then titrated with 0.1 M NaOH solution.

Figure 4:
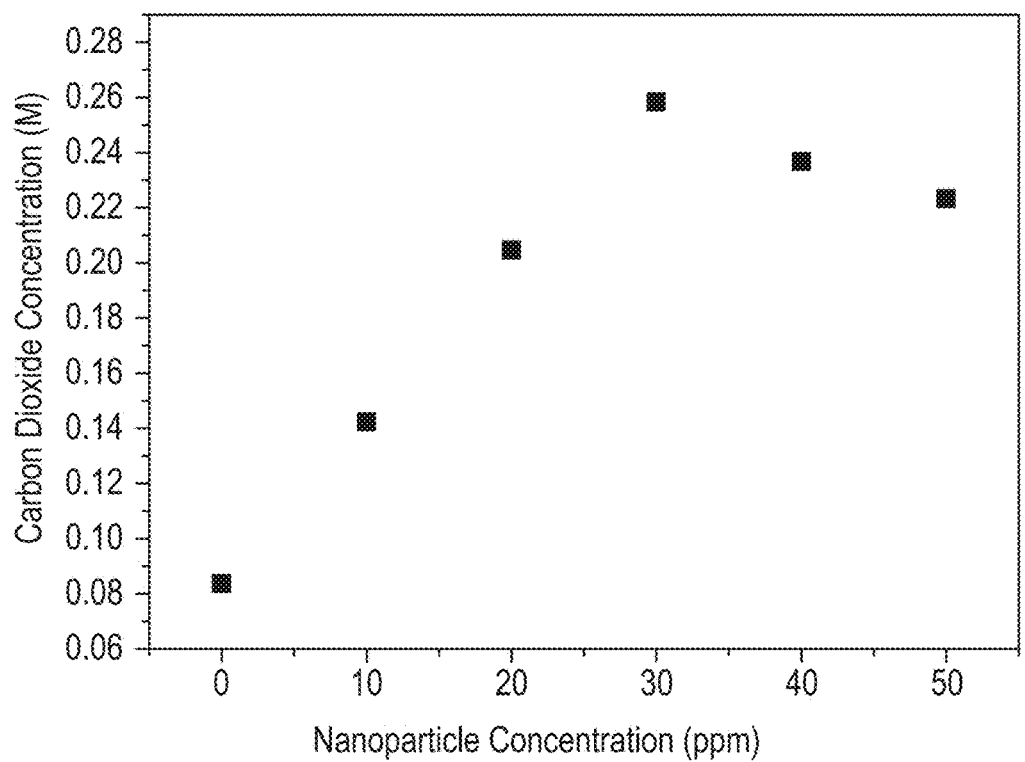
FIG. 4 shows Increase in the amount of carbon dioxide absorbed in aqueous solution of Ni nanoparticles as a function of particle concentration.

It is observed that when Ni nanoparticles are present in water, the carbon dioxide content of the solution after 30 min of bubbling increases (FIG. 4). As the concentration of nickel nanoparticles is increased there is an observed increase in the amount of carbon dioxide present in the water until a maximum is reached (at 30 ppm) and then the value slowly decreases.

Example 3

The $CO_2$ absorption rate experiments were done in a kit consisting of a fixed volume (200 ml) of water and $CO_2$ was sparged at 1 atm (0.01 MPa) pressure using a sinter. The pH and conductivity was measured a pH 209 bench top pH meter (Hanna Instruments) and pIONneer30 (Radiometer analytical). The temperature was maintained using a temperature bath BS5 (Fisher Scientific). The concentration of nickel nanoparticles was 30 ppm.

Figure 5A:
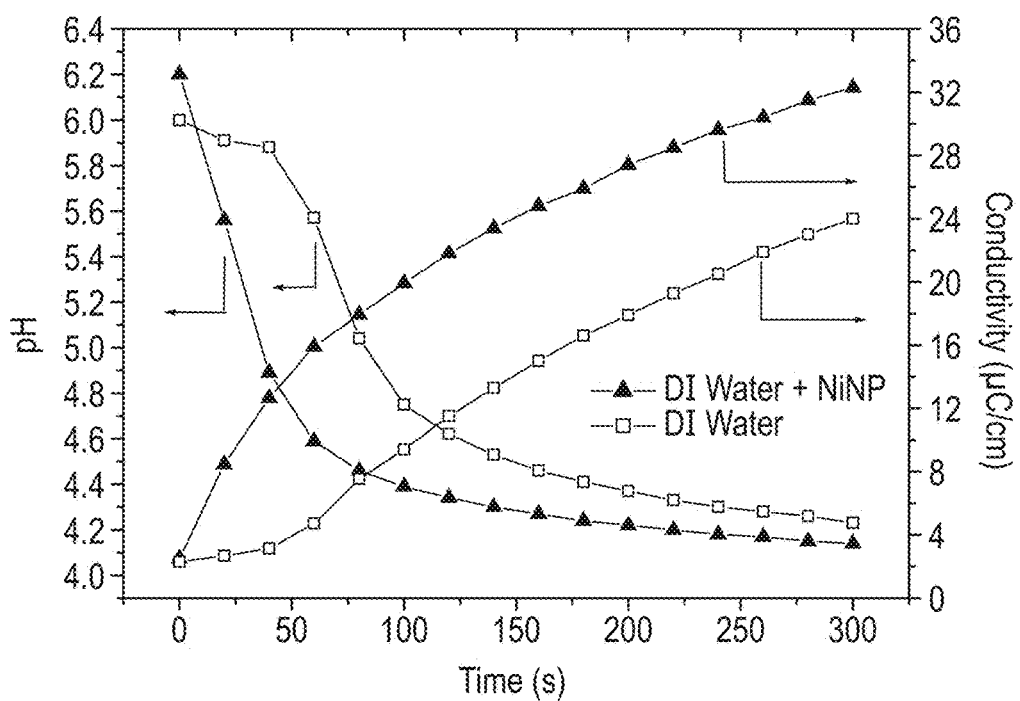
FIG. 5 shows pH change and conductivity change when carbon dioxide is bubbled in DI water and aqueous Ni nanoparticle suspension a) starting from pH above 6; b) starting at pH value below 6.
Figure 5B:
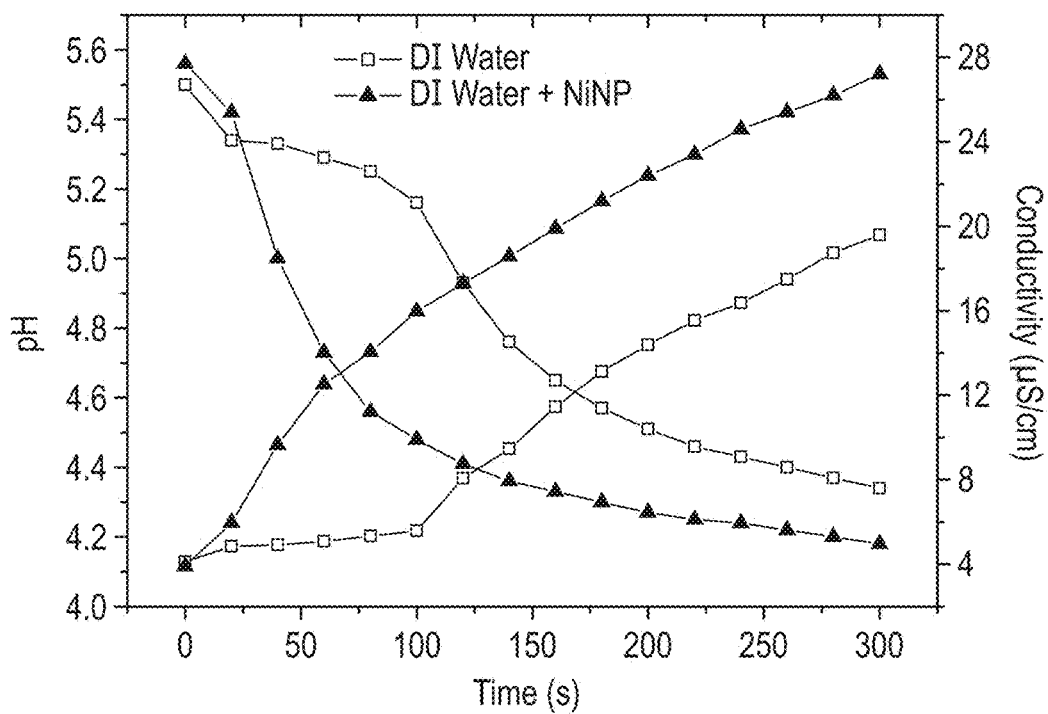

The rate of change of pH and conductivity can be seen in FIGS. 5a and 5b. Two sets of experiments were performed at different pH values to test the catalytic activity of Ni nanoparticles at pH values above and below 6 (FIG. 5a and FIG. 5b respectively). Since a drop in pH occurs due to the formation of carbonic acid, the rate of change in pH is related to the rate of reaction ($r_A$). It can be seen from FIGS. 5a and 5b that, in both cases, the rate of change in pH in the presence of the catalyst is faster than the rate of change in pH in the absence of the catalyst.

Likewise, it can be observed from FIGS. 5a and 5b that the rate of increase in the conductivity of the solution is higher in the presence of the nanoparticles than without.

Example 4

The nanoparticles were suspended in water and subjected to sonication for five minutes.

Figure 6:
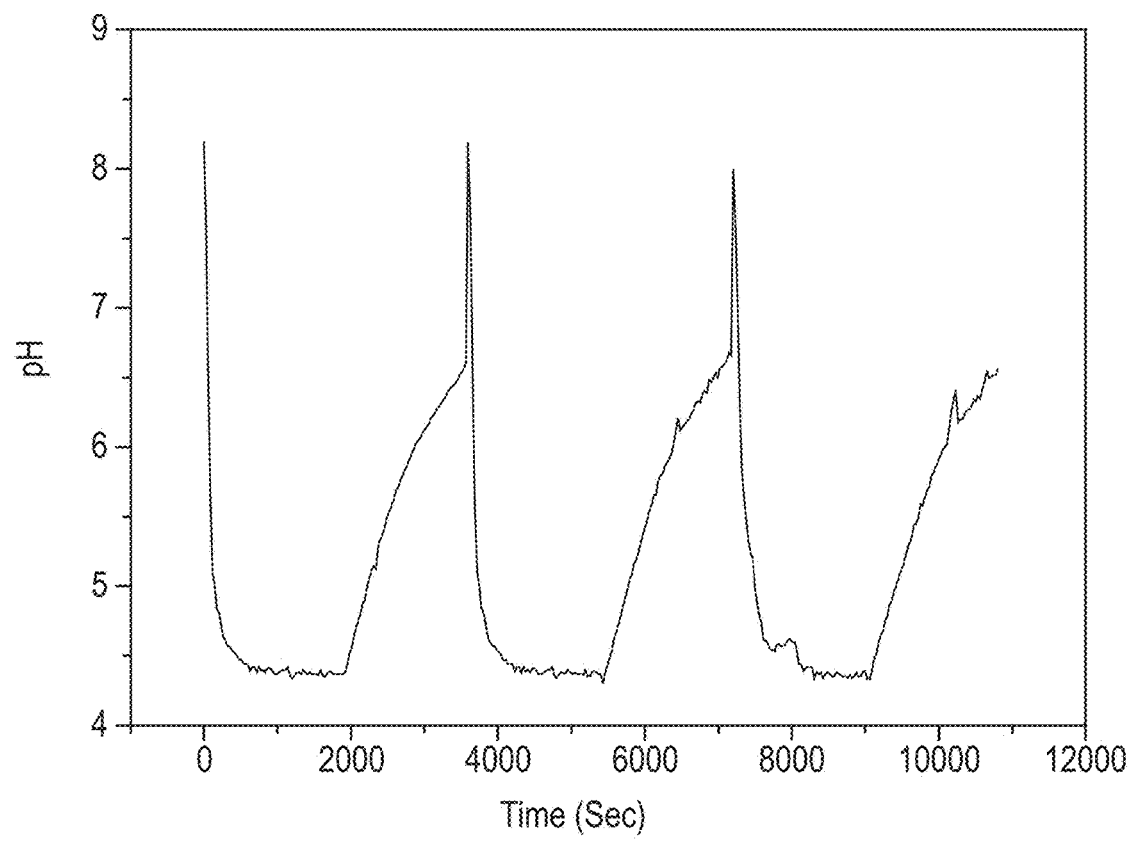
FIG. 6 shows pH change as $CO_2$ and argon are sequentially bubbled through a suspension of nickel nanoparticles.

The suspension was then bubbled with $CO_2$ gas (absorption run, seen by the drop of pH) for 30 min at one atmosphere pressure. Then the gas was changed to argon (desorption run, seen by increase in pH), and bubbled for another 30 min. At the end of the 25 min (desorption) the suspension was again sonicated and the procedure repeated again. The pH was continuously monitored for the absorption and desorption run and the variation in pH can be seen in FIG. 6.

Example 5

Deionised water was used for all the process (DC9, Purite UK). 99% pure $CO_2$ (BOC, UK) was used in the experiments. A nickel nanoparticle suspension was prepared by adding 6 mg of nickel nanoparticles (Nano Technology Inc, Korea) in 200 ml of deionised water and sonicated (Hilsonic) for 5 min till the solution becomes uniform. 200 ml of deionised water or nickel nanoparticle suspension was taken in a glass jar and was placed in a water bath (BS5, Fisher Scientific). The pH probe was inserted in the reactor and was recorded using a pH meter (HI 2550, Hanna Industries Ltd.) attached to the computer. The temperature of the water bath was maintained at the required temperature (±0.2° C.) (temperatures lower than room temperature were attained by adding ice to the water bath). The $CO_2$ was bubbled through the mixture at a gas flow rate of 1.69 mMmin$^{-1}$ and the changes in pH were recorded.

Figures 8A, 8B:
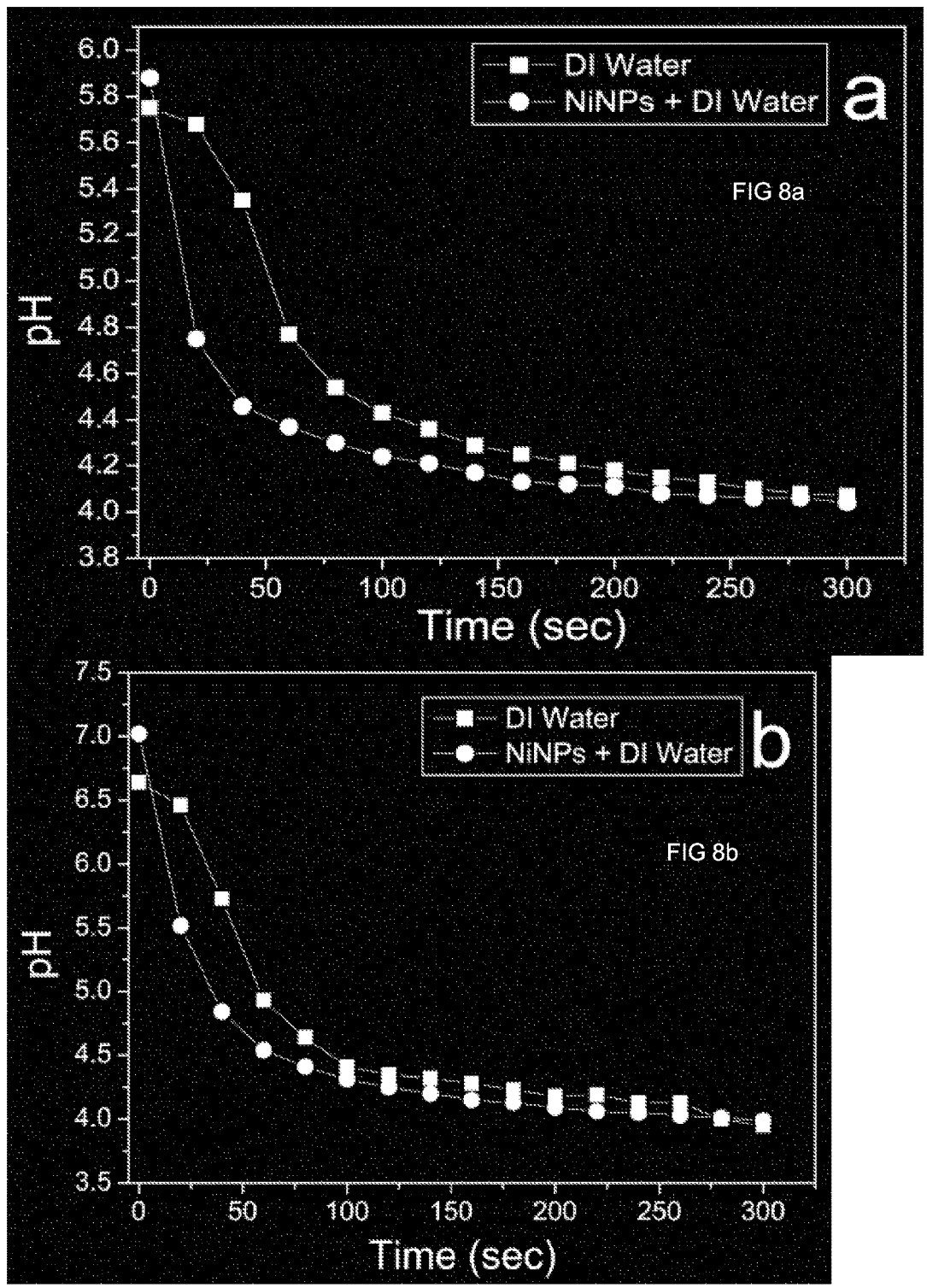
FIG. 8a) 10° C., FIG. 8b) 20° C., FIG. 8c) 30° C., FIG. 8d) 40° C., FIG. 8e) 50° C.
Figures 8C, 8D:
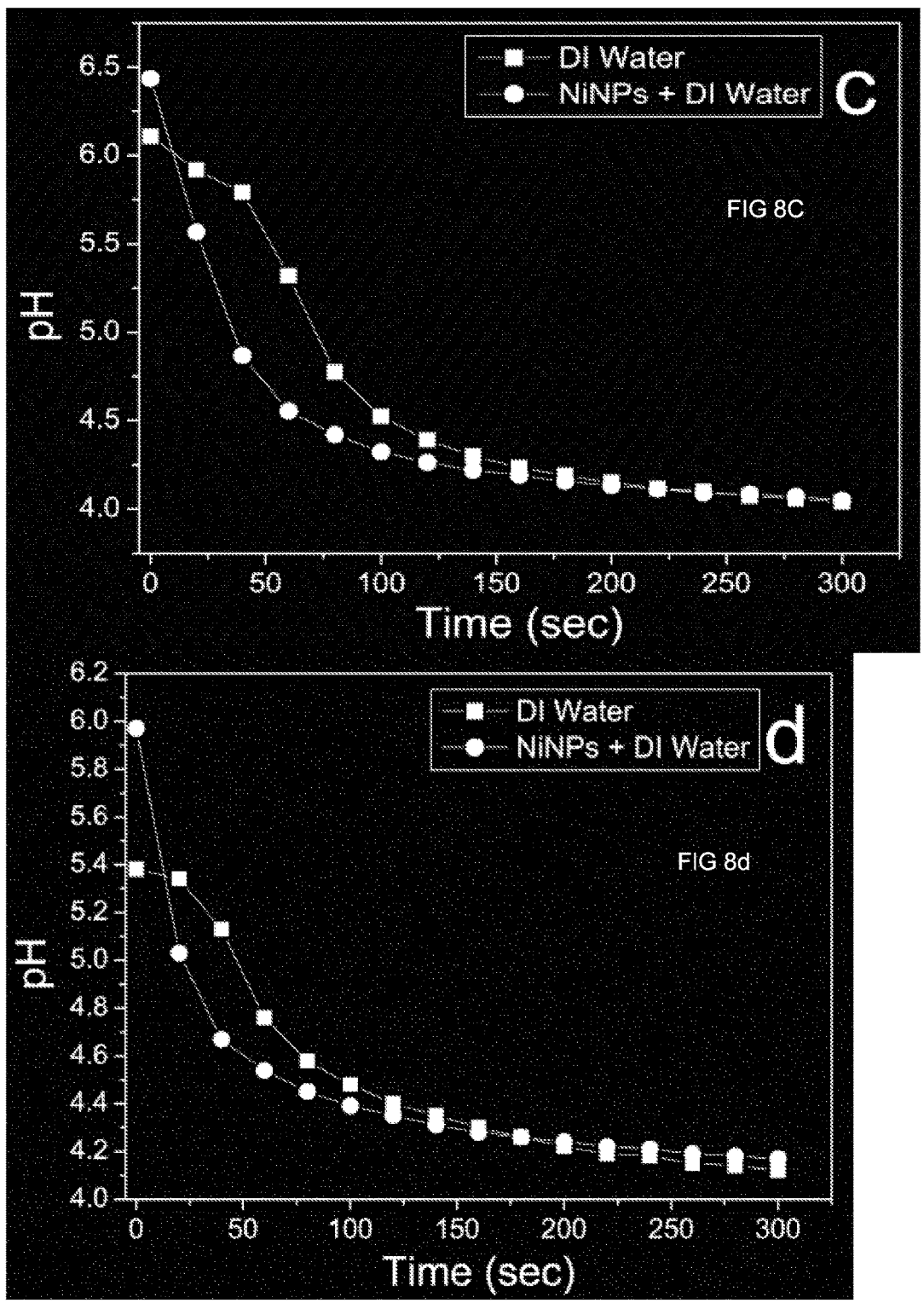
FIG. 8 shows the pH profile of deionised water and a nickel nanoparticle suspension at different temperatures as $CO_2$ is bubbled through the solution.
FIG. 8f) 60° C.
Figures 8E, 8F:
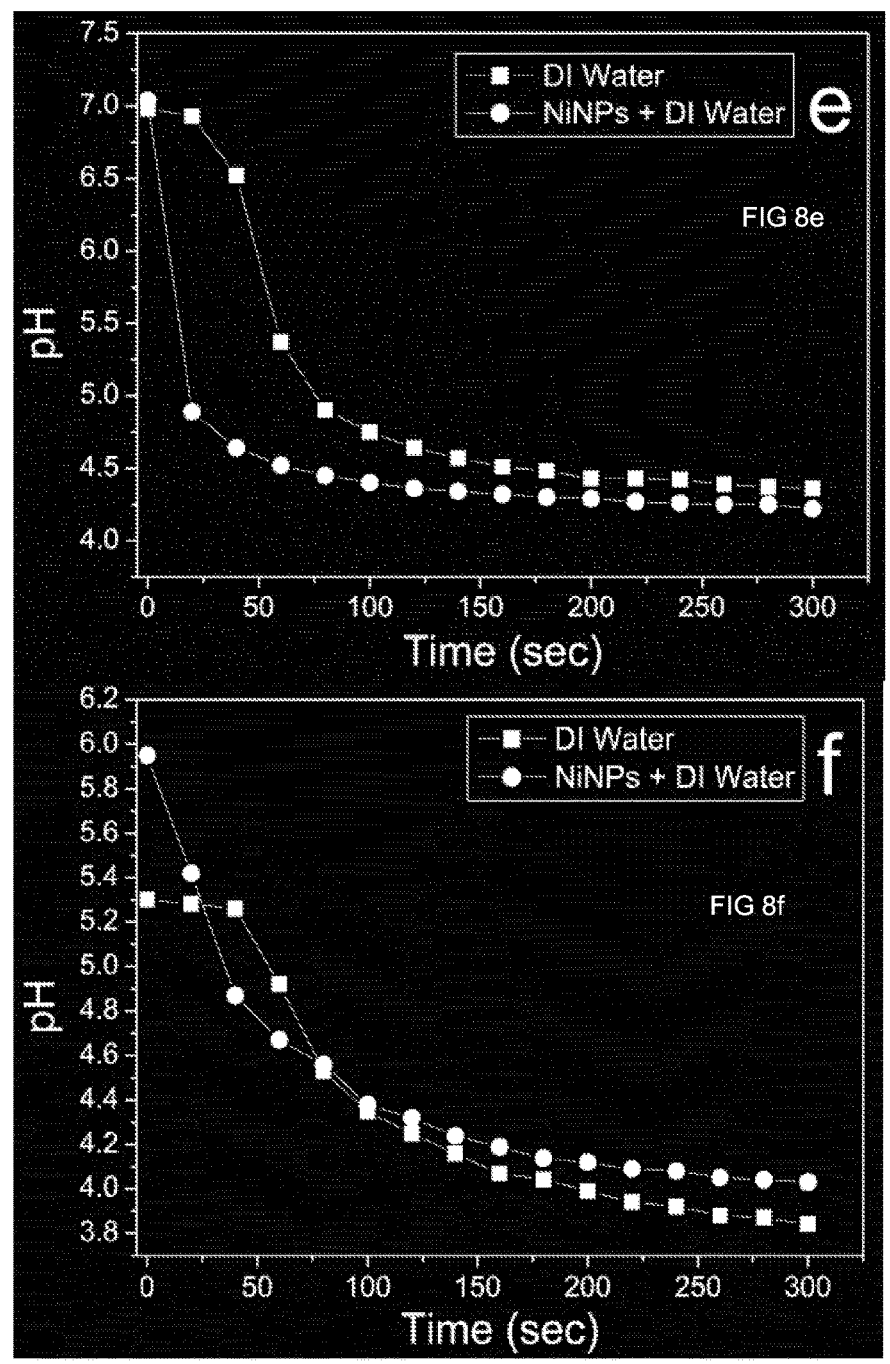

FIG. 8 shows the profiles of pH change during $CO_2$ was bubbled in deionised water (or nickel nanoparticles suspension) at various temperatures: a) 10° C., b) 20° C., c) 30° C., d) 40° C., e) 50° C. and f) 60° C. It can be observed that for the temperatures the nickel nanoparticles suspension have a faster change in pH than that of deionised water. This shows that the nickel nanoparticles have an effect on the reaction of $CO_2$ with water. The starting pH of nickel nanoparticles is greater than that of deionised water due to the basic nature of the nickel nanoparticles.

Example 6

The equilibrium concentration of $CO_2$ at different temperatures was calculated by bubbling $CO_2$ gas through a 20 ml jacketed reactor being maintained at required temperature. The concentration of the dissolved gas was calculated by titrating the solution with 0.1 M sodium hydroxide solution. The sodium hydroxide solution was standardized using potassium hydrogen phthalate of 0.1 M.

Figure 9:
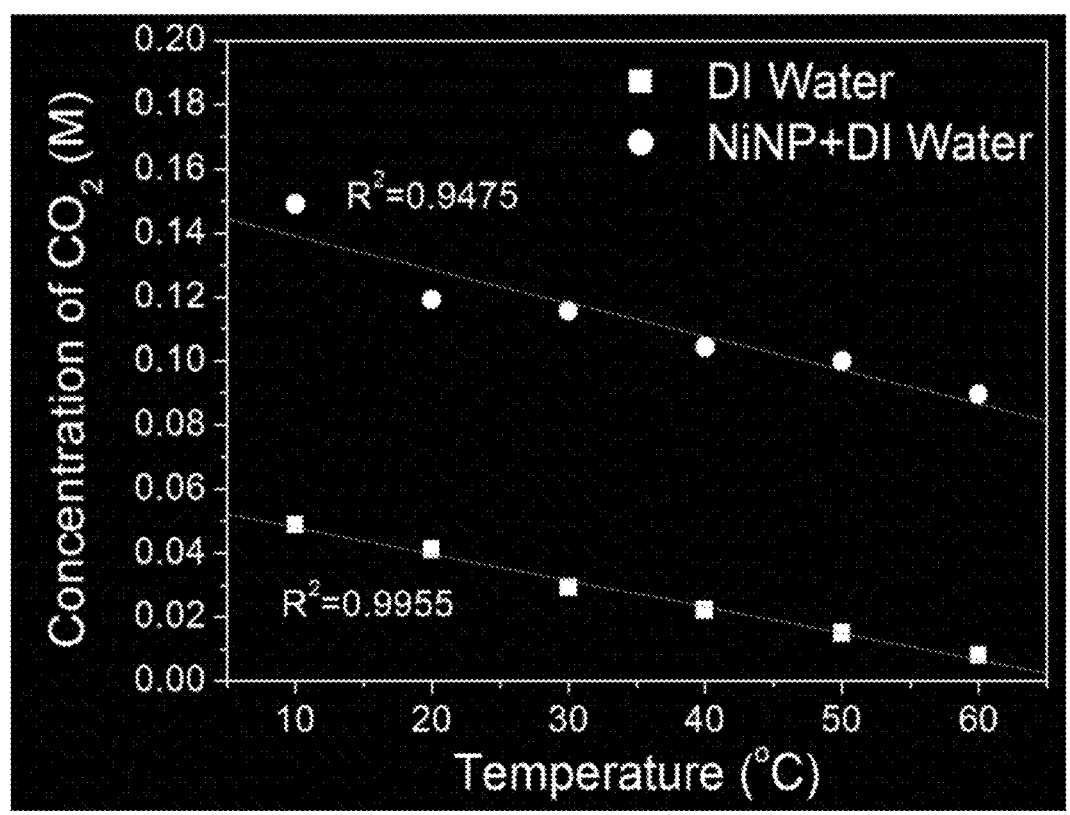
FIG. 9 shows the equilibrium concentration of $CO_2$ in nickel nanoparticle suspensions at different temperatures.

From FIG. 9 it can be observed that the nickel nanoparticle suspension (30 ppm) held more $CO_2$ than deionised water. The result, at 20° C., shows three times more absorption of $CO_2$ in nickel nanoparticle than deionised water, similar to the results shown in Example 2. Deionised water shows a linear trend in the decrease in concentration of $CO_2$ with increase in temperature. The nickel nanoparticles do not show a very strong linear dependence (i.e. the regression value is 0.94 in case of nickel nanoparticles and is 0.99 in case of deionised water).

Figure 10:
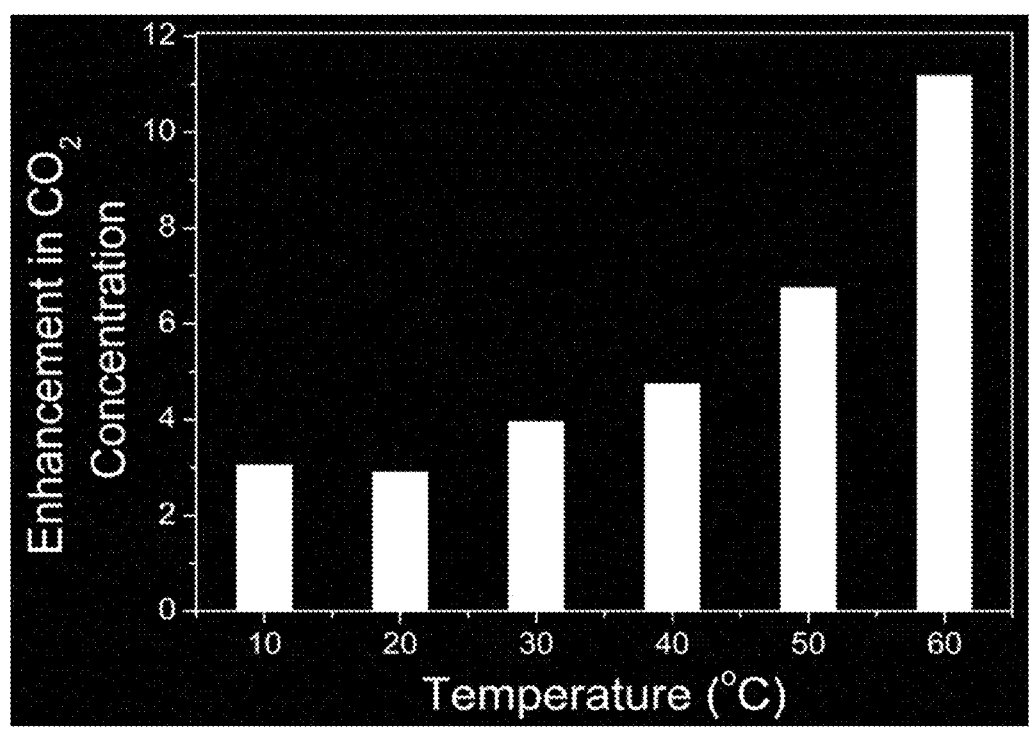
FIG. 10 shows the % enhancement of $CO_2$ for the nickel nanoparticle suspensions at each of the temperatures of FIG. 9.

FIG. 10 shows the amount of $CO_2$ uptake with increase in temperature. It can be observed from the figure that there is an enhancement of 11 times in the uptake capacity of the nickel nanoparticle suspension then that of deionised water at a higher temperature than deionised water alone.

Example 7

Mono ethanolamine (MEA; 99% purity) were bought form Sigma Aldrich and was used without further purification. Deionised water was used to prepare two 10 vol % solutions (100 ml). A 30 ppm suspension of the MEA solution was prepared by adding the required amount of nickel nanoparticles (Nano Technology Inc, Korea) to one of the MEA solutions. 100 ml of each solution/suspension was used for the pH profile studies. All the measurements were obtained at 20° C.

100 ml of solution being studied was placed in a 120 ml glass jar (Weatson, UK). The jar was placed in a water bath maintained at 20° C., a gas bubbler and pH probe were added and the jar was capped. The pH was measured using pH meter (HI 2550, Hanna Instruments) with data logging to a laptop. The gas was bubbled at a flow rate of 1.69

Figure 11:
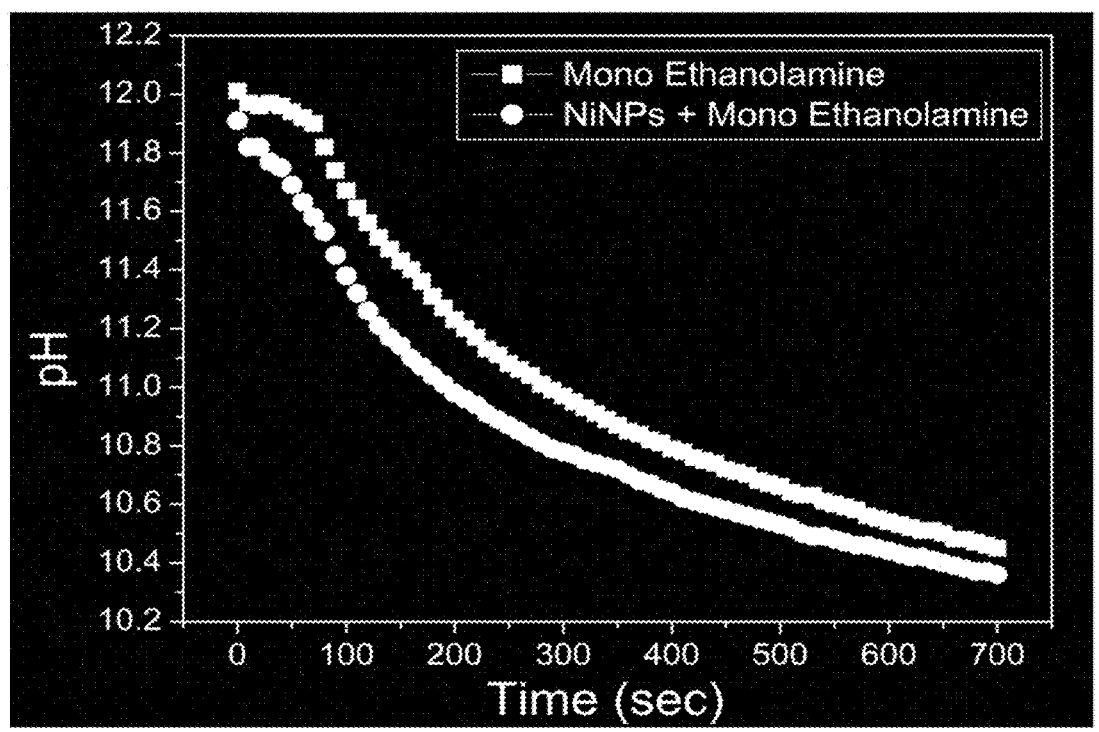
FIG. 11 shows the pH change profile for a mono ethanolamine (MEA) solution with and without nickel nanoparticles as $CO_2$ is bubbled through the solutions at 20° C.

FIG. 11 shows the pH change profile for the mono ethanolamine solutions in the presence and absence of nickel nanoparticles. It can be observed from the figure that the solution with the nickel nanoparticles suspended therein has a faster uptake of $CO_2$ than the one without nickel nanoparticles.

The invention claimed is:

1. A method of increasing the rate of hydration of carbon dioxide; the method comprising reacting carbon dioxide with water in the presence of nickel nanoparticles, nanowires or nanofibers by passing carbon dioxide through a liquid comprising the water.

2. The method of claim 1, wherein the liquid is an aqueous solution.

3. The method of claim 1, wherein Ni in the nickel nanoparticles, nanowires or nanofibres is substantially present in the (0) oxidation state.

4. The method of claim 3 wherein the nickel nanoparticles, nanowires or nanofibres comprise positive nickel ions on the surface.

5. The method of claim 4, wherein the positive nickel ions are $Ni^{2+}$ ions.

6. The method of claim 1, wherein the nickel nanoparticles, nanowires or nanofibres are immobilised on a solid support.

7. The method of claim 1, wherein the liquid is water or an aqueous solution.

8. The method of claim 1, wherein the nickel nanoparticles, nanowires or nanofibres are suspended in the liquid.

9. The method of claim 1, wherein the method further comprises the step of adding an $M^{2+}$ solution to the product of the reaction between carbon dioxide and water, wherein M is selected from Ca and Mg, or a mixture of the two.

10. The method of claim 9, wherein the $M^{2+}$ solution is an $MCl_2$ solution.

11. The method of claim 1, wherein the method further comprises the step of adding a base to the product of the reaction between carbon dioxide and water.

12. The method of claim 11, wherein the base is an alkali metal hydroxide.

13. The method of claim 12, wherein the base is NaOH.

14. The method of claim 1, wherein the method further comprises the step of adding an $M^{2+}$ solution and a base to the product of the reaction between carbon dioxide and water, wherein M is selected from Ca and Mg, or a mixture of the two.

15. The method of claim 14, wherein the $M^{2+}$ solution is an $MCl_2$ solution.

16. The method of claim 14, wherein the base is an alkali metal hydroxide.

17. The method of claim 1, the method further comprising the step of separating the nickel nanoparticles, nanowires or nanofibres from the product of the reaction between carbon dioxide and water.

18. The method of claim 1, wherein the method is continuous.

19. The method of claim 1, the method being a method of reducing the amount of carbon dioxide which enters the atmosphere from combustion, and wherein the carbon dioxide has been produced by combustion.

* * * * *